INVENTORS
STEN A.R. HANSEN
NILS E.A. BARKSTROM

United States Patent Office 3,456,562
Patented July 22, 1969

3,456,562
TIGHTENING ARRANGEMENT IN PNEUMATIC OR HYDRAULIC SERVOMOTORS
Sten A. R. Hansen, Lerum, Boras, and Nils E. A. Barkstrom, Landskrona, Sweden, assignors to Associated Cargo Gear Aktiebolag, Goteborg, Sweden, a corporation of Sweden
Filed Dec. 28, 1966, Ser. No. 605,461
Claims priority, application Sweden, Jan. 17, 1966, 574/66
Int. Cl. F01c 9/00; F16j 1/00
U.S. Cl. 92—122
8 Claims

ABSTRACT OF THE DISCLOSURE

A sealing border for the vanes in a rotational servomotor having an annular space formed between an inner and an outer part, which sealing border includes a stiff central portion and resilient inner and outer portions, the latter including resilient flanges. Bolts connected to the stiff portion are removably held in enlarged recesses in the vane, such that the sealing border can be removed without removing the bolt from the stiff portion.

---

Figure 1:
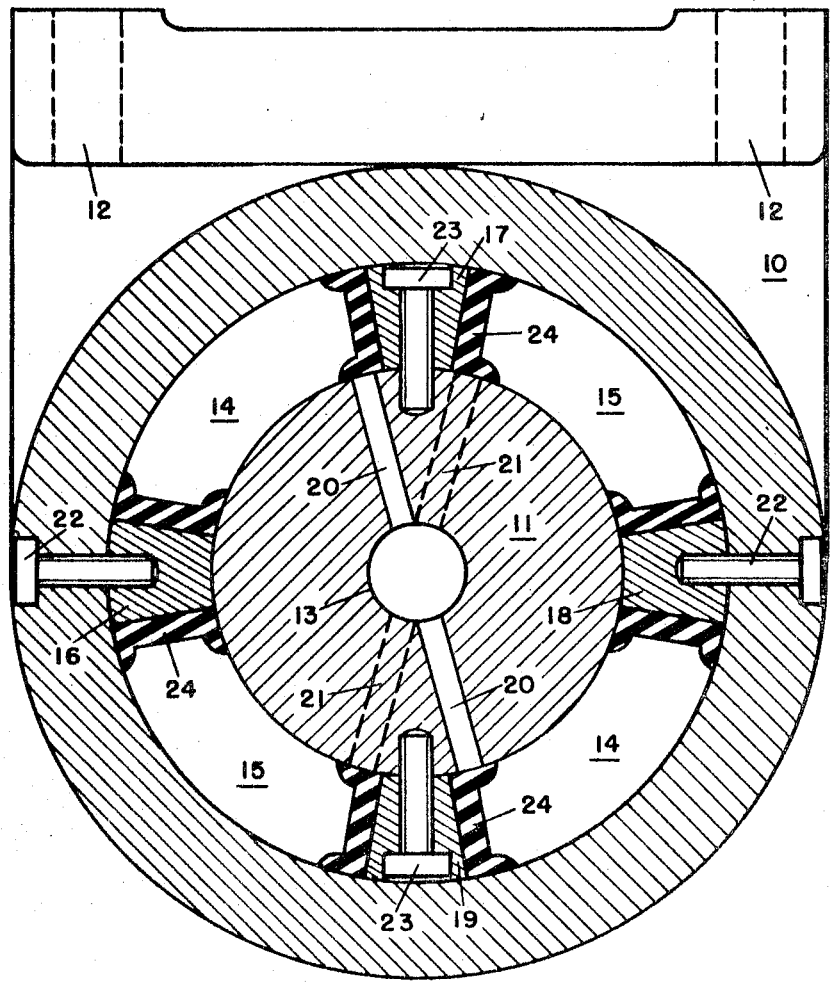

A type of pneumatic or hydraulic rotational servomotors is known, for opening heavy doors, gates and lids, especially cargo lids on vessels and the like and for closing them respectively, in which a sleeve formed outer part and an inner part, coaxial therewith form therebetween an annular space, in which vanes are alternatively attached to the inner part and to the outer part, so that when a pressure medium, for example oil under high pressure, is forced into every second chamber between said vanes and released from the remaining chambers, there will be relative rotational movement between the inner part and the outer part. While normally the inner part is fixed to the shaft of the door, the gate, the lid or the like, to be controlled, and the outer part is then stationary, the opposite disposition may also occur. Of course, when one desires to provide a greater rotation than can be provided by direct attachment of the controlled subject to the rotational part of the servo motor, then a suitable transmission system can be arranged between the rotational part of the servomotor and the part to be controlled.

Servomotors of this type work at extremely high pressure, usually amounting to some hundred kilograms per square centimeter but they may even still be higher. It is therefore of the utmost importance that the vanes are well sealed against the inner as well as the outer parts. For that purpose sealing borders are used on each side of each vane.

The sealing borders used for this purpose up to the present time were made from a rather stiff elastomer such as polyurethane rubber or nitrile rubber. However, they wear, and from time to time they have to be replaced. The replacement of the sealing borders has been a troublesome and difficult matter, especially since in order to ensure that the sealing borders were held securely in place, it has been necessary to attach them to the vanes by means of bolts running through the sealing borders. For this reason the sealing borders have been made in the form of channel-beam shaped constructions, with the middle portion being arranged in substantially radial direction, and the flanges of the beam applied close to the inner and outer surfaces of the vanes extending in substantially tangential directions. The bolts run through said middle portion, and these were in turn bolted alternatively to the inner part and to the outer part. For good sealing it was also necessary that the sealing borders have a limited possibility of movement in radial as well as in axial direction, and for this reason the prior art has provided bushings of some rather resilient elastomer in the bolt holes, often with a given room for play between the inner side of the bushing and the outer side of the fixture bolt.

For practical reasons, it is not posible to attach the fixture bolts very tightly along the sealing border. It is desired that the servomotor should have the highest possible power, and as this is dependent upon the pressure influenced area of the vanes, these should have a large surface area. Usually there is a large space available along the length of the servomotor, for instance if this is used for controlling ship cargo lids in which case the servomotor may be made as long as the lid; but on the other hand it is also necessary to keep the diameter of the servomotor of the kind concentrated as small as possible. The sealing borders may then also assume a substantial length, and the longer the sealing border, the more difficult will it be from a technical point of view to arrange the fixture bolts as tightly as would perhaps be desired. If too few fixture bolts are provided displacements may occur in that portion of the sealing border between the fixture bolts such that the sealing effect may be impaired or lost.

The last mentioned disadvantage has been minimized by inserting against the middle portion of the channel-formed border, a reinforcement plate but in practice this is not always possible. The small diameter of the servomotor necessitated by the great length of a servomotor of the kind concerned, requires that the annular space between the inner part and the outer part have an extremely small radial width. The fixture bolts have to run through the reinforcement plate, and they have to be provided with elastomer bushings. The dimension of the fixture bolts is governed by the need for rigidity, and thereafter the elastomer bushings should be of sufficient size so that the required movement is obtained in radial and axial direction. In order to make this possible one would have to make the reinforcement plate of such a width that it would extend the entire radial distance along the intermediate part between the two flanges. However, it would then form an obstacle preventing movement of the flanges which is necessary for the sealing effect. In practice, however, the reinforcement plate should take up no more than half the distance between the flanges of the proper sealing border of the elastically formable material.

Thus, there are two essential disadvantages, at least, with sealing borders known, heretofore for the purpose indicated above. Firstly, they are difficult to mount and they require at their mounting practically full dismantling and subsequent mantling of the servomotor, and secondly, they are not reliable without a reinforcement plate, but with such a reinforcement plate the sealing borders lack the ability to move axially as wel las in the radial direction.

Both of these disadvantages are eliminated by the present invention. The invention thus refers to a sealing border for use in the type of pneumatic or hydraulic servomotor which creates relative rotational movement between a first means and a second means, coaxial therewith, and which includes in the annular space between the two means vanes for separation of pressure chambers, sealing borders being attached to said vanes.

According to the invention, the sealing border, which is of channel-formed section and is attached at its intermediate part to the vane concerned and at each of its flanges in contact with the cylindrical outer and inner surface, respectively, of the two means is provided with a clamping bar arranged at the interior of the sealing border forming part of the intermediate part or being attached to the intermediate part, said clamping bar having a width of no more than half of the distance inside of the flanges of the sealing border, and the sealing border further being provided with means, attached to the intermediate part of the clamping bar as well as the vane for removably fixing the sealing border to the sides of the vanes.

Preferably, the last said means includes removable connecting bolts directed inwardly from the sealing border for engagement in enlarged recesses in the side of the vane.

According to a further feature of the invention, the enlarged recesses are wide enough so that the bolts fit loose therein.

The invention will be further described below in connection with the attached drawings, but it is understood that the invention is not limited to the form of execution shown in the drawings but that different modifications may occur within the spirit and scope of the invention.

Figure 2:
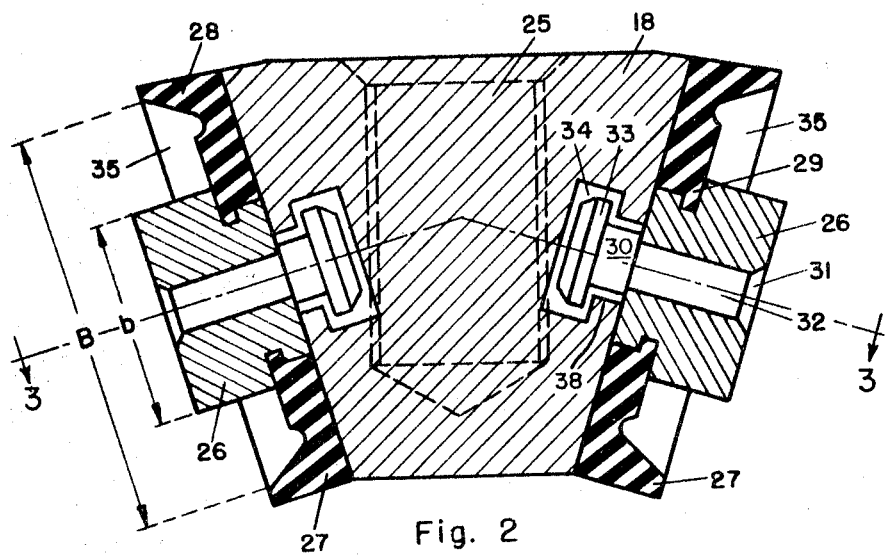
Figure 3:
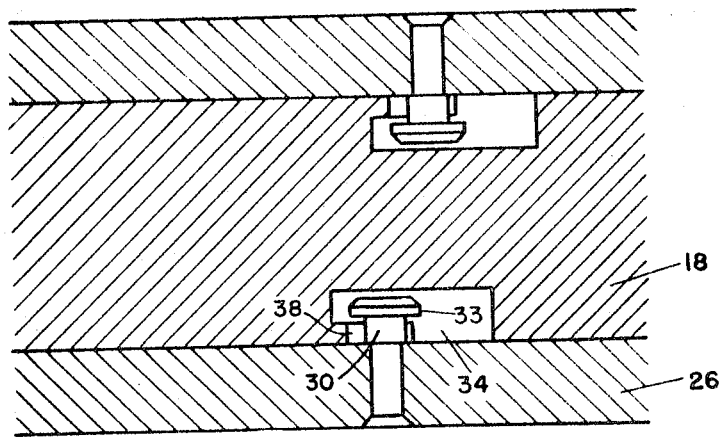

In the drawings, FIG. 1 is a schematic view showing the general construction of a servomotor of the known kind in section, perpendicularly to the axis; FIG. 2 shows a section through a vane along with the sealing borders attached thereto; and FIG. 3 shows a section through same vane, taken along line 3—3 of FIG. 2.

In FIG. 1 the outer means of the servomotor is indicated by 10 and the inner means by 11. It is unimportant to the invention whether the outer means is attached to the part to be rotated by the servomotor, the inner means being locked against rotation or vice versa because the purpose of the servomotor is mainly to provide for relative movement between the two means 10 and 11. However, for purposes of illustration, assume that the outer part 10 is held stationary and that the inner part 11 is connected to the part to be moved.

The means 10 is thus provided with holes 12 for fixture bolts, whereas the means 11 is suitably connected to the part to be moved by means of a groove wedge construction at one end or at both ends. The means 11 in the drawing is shown in the form of a hollow shaft with two center coaxial bores extending toward each other but not communicating, only one of the bores 13 being visible in the drawing. An annular space is provided between the means 10 and 11, in which space into chambers 14 and 15. Of course any number of vanes could be provided, the actual number of vanes depending upon such factors as, for example, the angle by which the servomotor should rotate between fully closed and fully opened position.

From the center bore visible in the drawings, branch conduits 20 are conducted to two of the chambers, for example, the chambers 14 whereas the two remaining chambers 15 are connected by means of branch conduits 21 to the center bore not shown in the drawings.

The vanes 16 and 18 are attached to the outer means by means of a series of bolts 22, and the vanes 17 and 19 are in a corresponding way attached to the inner means by means of a series of bolts 23.

The above described arrangement, which is known per se, operates as follows. It is assumed that the inner means 11 comprises a shaft, locked against rotation, whereas the outer means 10 is attached by means of bolts running through the fixture holes 12 to some controlled part, for instance a lid, which is opened from its horizontal position by being turned into vertical position or vice versa.

It is further assumed that a pressure medium conduit with a controlled valve is connected to the conduit 13, and that this valve is made in such a way that it will alternatively connect the conduit 13 with the pressure medium or with a discharge conduit for releasing the pressure medium. Similarly, that conduit longitudinally coinciding with the conduit 13 and which is not visible in the drawing is connected to same source of pressure medium and to the same or another discharge conduit for releasing the pressure medium. Dependent upon circumstances, the second source of pressure medium may be dispensed with, for example, if the weight of the lid is such that it will tend by proper force to fall back from its vertical position to its horizontal position.

When the lid is to be moved, the conduit 13 is connected to the source of medium under pressure, and the other center conduit is connected to a discharge conduit for discharging the medium under pressure, which medium under pressure may be pneumatic or hydraulic. Often, it will comprise oil under pump pressure of an order of magnitude up to a couple of hundred of kilograms per square centimeter.

The chamber 14 is now filled with the medium under pressure and it will expand by the vanes 16 and 18 rotating in counter clockwise direction, simultaneously as the volume of each of the chambers 15 decreases. Medium under pressure, which had been stored up in these chambers, now flows away through the conduits 21.

It will be understood that large differences in pressure can exist across each of the vanes 16–19, and that tight sealing must be provided. For this reason, sealing borders 24 are provided on each side of each of said vanes, said sealing borders having the sectional form of a broad channel beam with only the flanges being resiliently deformable and with the intermediate part being attached to the side of the vanes 16–19, the flanges being in lid sealing contact with the outer surface of the means 11 and the inner surface of the means 10, respectively. Since the servomotor is rather long, and the radial width of the chambers 14 and 15 rather limited, it is extremely difficult to stabilize sealing border against all kinds of canting movements. Nevertheless, experience has shown that the sealing border, to be effective, must have a given limited freedom of movement for self-adjustment in the radial as well as in the axial direction, and that it must not be bolted so rigidly to the sides of the vanes that this self-adjustment is prevented.

In FIG. 2, cross-section perpendicularly to the axial direction is shown through a vane, for example vane 18 provided with sealing borders according to the present invention. The vane includes bolt holes 25 for the fixture bolts 22. Each sealing border comprises a clamping bar 26, and on each side thereof elastomer strips 27, 28. These are thus, not formed as an integral piece, but, are connected at groove joints 29 to the clamping bar 26. Suitably, they are vulcanized to this clamping bar.

The attachment between the sealing border and the vane is so arranged that a hole is bored through the clamping bar 26 of the sealing border and provided with a counterbore 31 at its outer end. In this hole, before mounting the sealing border, preferably during its manufacture, the shaft of the connecting bolt 32 is inserted from that side which will later be on the inner side of the sealing border. The connecting bolt is retained in correct position by attachment of a shoulder thereon against the inner side of the sealing border, whereas the outer end of the shaft is attached by riveting in the counterbore 31, the rivet head thereafter being planed off.

On its inwardly turned side, thus, the connecting bolt 32 carries a neck portion 30 and a head 33, which, in the mounted position of the sealing border rests in shoulder 38 and in enlarged recess 34, respectively.

The sealing border should be made from some stiff elastomer resiliently deformable to a required degree for providing sealing under influence of the high pressures occurring in the interior of the servomotor. The clamping bar 26 should be very stiff and may for instance be a steel bar. Radial moveability of the sealing border is necessary. For example, one of its flanges may be bent inwardly and, in order that there shall be room for such a movement, the clamping bar must not take up more than a small part of the radial distance of the space inside of the cavity in the channel formed section between the flanges. In the illustrated form of execution, the width of the bar is 51.5% of the width B of the free surface between the inside of the contact surfaces of the flanges. This permits sufficient free area 35 of approximately 25.75% on each side of the bar. The dimension of this play area, of course may vary from case to case, but it should be in the order of magnitude of about one fourth of the total free space.

Referring once again to the prior art, if one now mounted a bushing made from a resilient elastomer through the intermediate part and a bar, respectfully and provided this bushing with a center hole, and mount a bolt through this center hole for fixture of the sealing border to the vane, then it would be impossible to satisfy all of the following three demands:

Firstly, the bolt should have a strength which will give a sufficient rigidity.

Secondly, the bushing should have a dimension which will give sufficient elasticity and resilience for radial and axial movements.

Thirdly, there shall still be sufficient material in the bar outside of the bushing circumference in order that the bar shall not be weakened to a nonallowable degree in spite of its outer dimensions being limited as mentioned above.

The problem thus derived obviously results from the small radial width of the chambers 14, 15. However, the chambers cannot be made wider since the construction would become impractical by consuming too big volume of hydraulic or pneumatic fluid.

The problem thus existing is therefore solved according to the present invention by the connection between the sealing border and the vanes intentionally being made rather loose. The result has been surprisingly good and contrary to what would be expected concerning the function of servomotor sealing borders of the type concerned. As a matter of fact, the bushings earlier used were elastic, and one had for that reason assumed, that an elastic restoring force would be necessary for restoring the sealing border into its normal position when it had for one reason or another been displaced in radial or axial direction from this normal position. Tests which have been made, however, have proved that this elastic restoring force for reversion of displacements in radial direction is, contrary to what one had earlier assumed, created to a sufficient degree by the flanges of elastomer. Moreover, no restoring force is necessary for reversion of an axial displacement but if it should in some case prove to be required, it may easily be provided for by application of resilient force against the ends of the sealing border.

For the purpose indicated one now provides for a series of connecting bolts and corresponding enlarged recesses in the vane along the sealing border, and care is thereby taken that all of the connections are loose to a sufficient degree.

The arrangement also causes the further advantage that replacing of a sealing border is extremely simplified as it does not require demantling of the servomotor as has been necessary heretofore. This, of course, is provided by the arrangement best shown in FIGURE 3, wherein the head 33 can be moved axially of the vane to move neck 36 away from shoulder 38 and then out of recess 34, without the need for unscrewing the bolt 32.

We claim:
1. In a fluid operated servomotor of the type including first and second coaxial parts which form an annular space therebetween and which are relatively rotatable about an axis, and including vanes attached to said first and second coaxial parts, respectively, and arranged to extend axially in the said annular space for dividing said annular space into a plurality of axially extending chambers, and including sealing borders on the radial faces of the vanes, the improvement wherein: at least one of said sealing borders includes an intermediate part extending along a radial face of its respective vane, and inner and outer flanges connected to the intermediate part and extending tangentially away from the vane and normally contacting the inner and outer surfaces of their chamber, said intermediate part including a stiff portion having at least one connecting bolt rigidly attached thereto and having an enlarged head on the side of the sealing border facing its corresponding vane, said vane including a recess opening into the radial face, a part of said recess being of sufficient depth and width to receive said head in a direction generally perpendicular to the radial face, and including a shoulder portion extending across a part of the recess for preventing removal of said head, and hence removal of the sealing border, when the head is moved behind the said shoulder.

2. The invention of claim 1 wherein said stiff portion extends in the radial direction for a distance no greater than one half of the total distance between the said inner and outer flanges.

3. The invention of claim 1 wherein the said recess and the said shoulder portion are sufficiently large, relative to the head, that the head fits loosely, with play, into said recess and said shoulder portion.

4. The invention of claim 1 wherein said sealing border comprises a separate clamping bar forming said stiff portion, and a pair of elastic strips connected to and extending radially inwardly and outwardly from the bar and having the said inner and outer flanges formed thereon.

5. The invention of claim 4 wherein said elastic strips are connected to said clamping bar by tight engagement of the strips into grooves formed in the clamping bar.

6. The invention of claim 5 wherein said elastic strips are vulcanized to the said clamping bar.

7. The invention of claim 1 wherein said at least one bolt includes a shaft extending through the stiff portion and a rivet head connecting the shaft to the stiff portion adjacent that side of the sealing border away from the vane.

8. In a fluid operated servomotor of the type including first and second elongated coaxial parts which form an elongated annular space therebetween and which are relatively rotatable about an axis, and including elongated vanes attached to said first and second coaxial parts, respectively, and arranged to extend axially in the said elongated annular space for dividing said annular space into a plurality of elongated axially extending chambers, and including elongated sealing borders extending axially on the elongated radial faces of the vanes, the improvement wherein: at least one of said sealing borders includes an elongated intermediate part extending in the axial direction along a radial face of its respective vane, and inner and outer flanges connected to the intermediate part and extending tangentially, relative to said axis, away from the vane and normally contacting the radial inner and outer surfaces of their chamber, said elongated intermediate part including a stiff portion having at least one connecting bolt rigidly attached thereto and having an enlarged head on the side of the sealing border facing its corresponding vane, said vane including a recess opening into the radial face and elongated in the axial direction, a first part of the said recess being of sufficient depth, length and width to receive said head in a direction generally perpendicular to the radial face, and a second part of the recess axially adjacent to the first part including a shoulder portion open axially toward the first part of the recess, for preventing removal of said head, and hence removal of the sealing border, when the head is moved behind the said shoulder.

References Cited

UNITED STATES PATENTS

| | | | |
|---|---|---|---|
| 163,186 | 5/1875 | Hall | 92—120 X |
| 374,968 | 12/1887 | Kadel | 92—120 X |
| 2,246,457 | 6/1941 | Schultz | 287—20.5 |
| 2,408,346 | 9/1946 | Smith | 92—128 |
| 2,556,648 | 6/1951 | Gorsuch | 92—244 X |
| 2,633,105 | 3/1953 | Lasater | 92—125 |
| 2,704,680 | 3/1955 | Bedford | 287—20.5 |
| 2,811,142 | 10/1957 | Shafer | 92—122 |
| 3,391,612 | 7/1968 | Sneen | 92—255 X |
| 3,032,020 | 5/1962 | Sneen | 92—125 X |
| 3,173,344 | 3/1965 | Mongitore | 92—120 X |

FOREIGN PATENTS 1,146,782  4/1963  Germany.

MARTIN P. SCHWADRON, Primary Examiner

IRWIN C. COHEN, Assistant Examiner

U.S. Cl. X.R.

92—125, 128, 244, 255